United States Patent [19]

Nola

[11] 4,039,946
[45] Aug. 2, 1977

[54] TACHOMETER

[75] Inventor: Frank J. Nola, Huntsville, Ala.

[73] Assignee: The United States of America as represented by the Administrator of the National Aeronautics and Space Administration, Washington, D.C.

[21] Appl. No.: 667,928

[22] Filed: Mar. 18, 1976

[51] Int. Cl.² .............................................. G01P 3/52
[52] U.S. Cl. .................................... 324/165; 324/163; 340/347 SY; 340/347 P; 340/271; 324/174
[58] Field of Search ............... 324/165, 163, 174, 164, 324/166; 340/271, 347 SY, 347 P

[56] References Cited

U.S. PATENT DOCUMENTS

| | | | |
|---|---|---|---|
| 3,018,395 | 1/1962 | Carlstein | 324/164 X |
| 3,357,012 | 12/1967 | Brook | 340/347 |
| 3,641,565 | 2/1972 | Ivers et al. | 340/347 SY |
| 3,742,243 | 6/1973 | Gamble | 324/174 X |
| 3,868,680 | 2/1975 | Rhodes | 340/347 SY |
| 3,872,388 | 3/1975 | James | 340/347 SY X |

Primary Examiner—Rudolph V. Rolinec
Assistant Examiner—Vincent J. Sunderdick
Attorney, Agent, or Firm—L. D. Wofford, Jr.; George J. Porter; John R. Manning

[57] ABSTRACT

A tachometer in which sine and cosine signals responsive to the angular position of a shaft as it rotates are each multiplied by like, sine or cosine, functions of a carrier signal, the products summed, and the resulting frequency signal converted to fixed height, fixed width pulses of a like frequency. These pulses are then integrated, and the resulting DC output is an indication of shaft speed.

5 Claims, 2 Drawing Figures

TACHOMETER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to tachometers, and particularly to a tachometer which will provide a DC output voltage of a sign representative of the direction of rotation of a shaft and of a magnitude proportional to shaft speed.

2. General Description of the Prior Art

Many applications require a DC signal indicative of the speed of rotation of a shaft. The most commonly employed device for this purpose is a brush-type generator which is, of course, an AC generator which provides a DC output by commutation. Alternately, the output of an AC generator is rectified by a solid state or other discrete rectification element. A third type device is disclosed in a previous patent application by the applicant, now U.S. Pat. No. 3,541,361, and in it hall effect crystal are electrically biased by windings of a permanent magnet AC generator and are magnetically biased by rotation of the permanent magnet as an armature. Of these devices, brush-type tachometers suffer from ripple-type outputs and undesired torque between brushes and commutator. Separate rectification of the output of pure AC generators is sometimes unsatisfactory because of poor linearity of the rectification devices used therewith and because of displacement error at zero speed. The applicant's previous invention solves most of the disadvantages of the other two devices, but it has been found that there are instances where higher output voltages are required than can be obtained from it.

SUMMARY OF THE INVENTION

In accordance with the present invention, the foregoing and other disadvantages encountered with prior devices are overcome by system in which, by means of a shaft encoder, two outputs are obtained, one being representative of the sine of a shaft angle, and the other being representative of the cosine of the shaft angle. Each of these outputs is multiplied by a carrier signal, the sine output by a sine carrier signal, and the cosine output by a cosine carrier signal. The two products are then added, and the resulting signal is squared to provided fixed height, fixed width pulses which, when integrated, provide a DC speed signal. When shaft speed is zero, a sum signal will be representative of the carrier signal alone; and in order to provide a calibrated output wherein at zero speeds there is a zero output of the systems, means are provided to furnish a reference output equal to the output of the integrator, a zero speed , and to subtract the reference output from the integrator output. The resulting difference signal then indicates direction by the sign of the output and speed by the magnitude of the output.

DETAILED DESCRIPTION OF THE DRAWINGS

Figure 1:
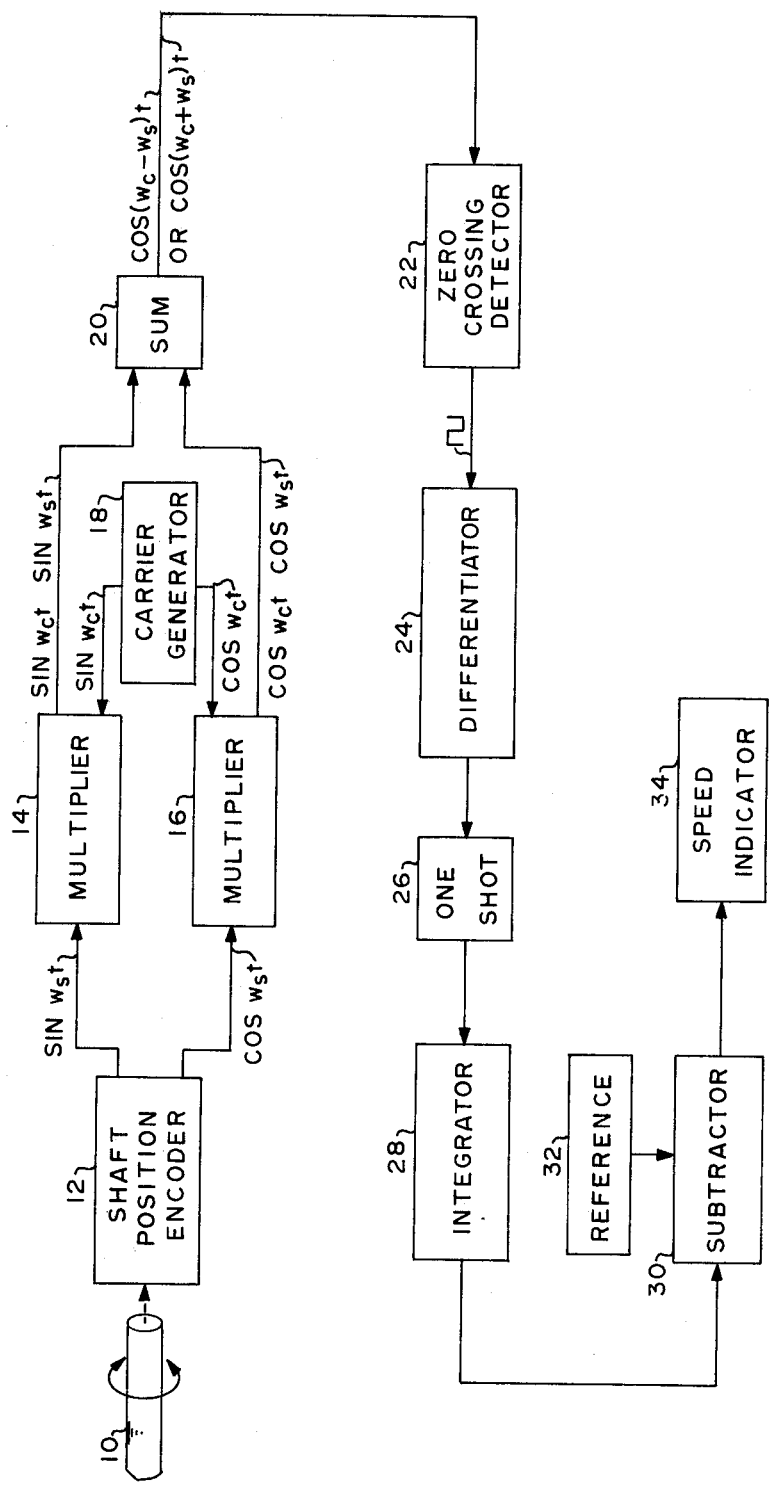
FIG. 1 is an electrical schematic diagram of an embodiment of the invention.

Referring to FIG. 1, shaft 10 is representative of a shaft which is to be monitored. It is coupled to a shaft positon encoder or transducer 12 which provides as an output a first signal representative of the sine of the angular position of shaft 10 as rotated from a reference position. This output, labelled SIN $w_s t$, is applied as one input to multiplier 24. Encoder 12 also provides a second output representative of the cosine of the angle of the shaft position. This output is labelled COS $w_s t$ and is applied as one input to multiplier 16. Typical devices which perform these encoding functions include optical encoders, electromagnetic types and Hall effect devices displaced 90° about a circle of rotation of a magnet mounted on a shaft to be monitored.

Carrier frequency generator 18 provides a reference input SIN $w_c t$ to multiplier 14 and a reference input COS $w_c t$ to multiplier 16, the carrier frequency of generator 18 being at least five times the frequency of the highest frequency output anticipated from the output of encorder 12, this being determined by the anticipated maximum shaft speed of shaft 10. The product of multiplier 14, SIN $w_c t$, SIN $w_s t$, is applied as one input to summing device 20, and the product COS $w_c t$ COS $w_s t$ is applied as a secondinput to summing device 20. The output of summing device 20 is thus $COS(w_c - w_s)t$ or $COS(w_c + w_s)$ or $COS(w_c + w_s)t$, depending upon the direction of rotation of shaft 10. This output is fed to zero crossing detector 22 which provides a rectangular waveform at the frequency of the sine wave input to zero crossing detector 22.

In order to provide an accuracy shaped rectangular waveform with constant height and width pulses, the output of zero crossing detector 22 is fed to differentiator 24 which provides the steep wavefront pulses corresponding to a leading, or trailing, edge of the signal applied to diferentiator 24, and these pulses are fed to one-shot multivibrator 26 which provides the desired train of fixed width, fixed height pulses at the frequency of the output of summing device 20. The output of one-shot 26 is fed of integrator 28 which integrates or averages the fixed, height, ixed width pulses to provide a DC output which varies in magnitude in accordance with frequency.

For the condition of zero speed of shaft 10, the frequency of the input to integrator 28 is equal to the reference frequency output of carrier generator 18, and the frequency increases for shaft directions in one direction, and decreases in frequency shaft directions in the other direction. Thus, at zero speed, there is a finite output of integrator 28, which would increase in value as the speed of shaft of shaft 10 increases in a first direction, and decreases in value as the speed of shaft 10 decreases in the opposite direction. In order to provide a more usable output, the output of integrator 28 is fed to substrator 30, togehter with an electrical bias from reference 32 of a value equal to the output of integrator 28 for the condition of zero shaft speed. Thus, the output of subtractor 30 would be zero for conditions of zero speed and would rise in a first direction (polarity) upon rotation of shaft 10 in one direction, and would rise in a second direction (polarity) when shaft 10 is rotated in the opposite direction. The output of subtractor 30 is fed to speed indicator 34 which could be in the simple form of a galvanometertype meter wherein an increase in speed in one direction of shaft 10 causes the meter to move in one direction, and an increase in speed in the opposite direction causes the needle of the meter to move in the opposite direction. The magnitude of movement would typically be calibrated in terms of revolutions per minute. Alternately, the output of subtractor 30 would be applied to other types of conventional indicators or be applied as a control voltage for a servo system to control the speed of rotation of some device, to which shaft 10 is coupled.

Figure 2:
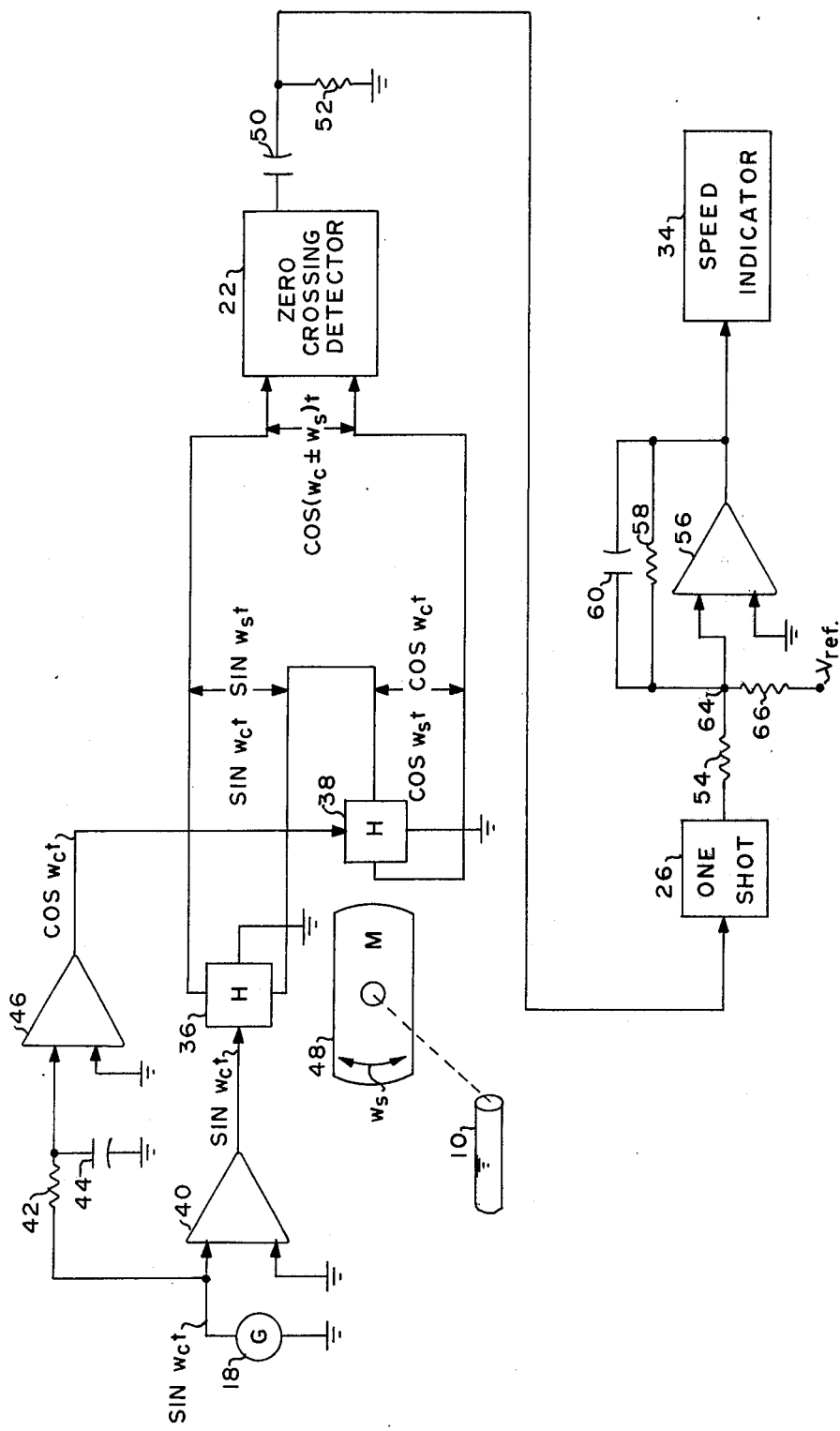
FIG. 2 is an electrical schematic diagram of alternate embodiment of the invention.

FIG. 2 illustrates an embodiment of the invention in which Hall effect devices 36 and 38 perform both the function of generating sine and cosine voltages proportional to shaft position and the multiplications performed by multipliers 14 and 16 of FIG. 1.

Signal generator 18 generates a carrier frequency signal of SIN$w_c t$, and it is fed through amplifier 40 to an electrical input of Hall effect device 36. This signal is also fed through a 90° phase shifter comprising resistor 42 and capacitor 44 to provide a signal COS $w_c t$, which is then amplified in amplifier 46 and provided as an electrical input to Hall effect device 38. Magnet 48 is mounted on shaft 10 to be monitored, and Hall effect devices 36 and 38 are angularly displaced 90° about the rotational path of magnet 48. The resulting electrical outputs of the Hall effect being SIN $w_c t$ SIN $w_s t$ for Hall effect devices 36, and COS $w_c t$ COS $w_s t$ for Hall effect device 38, are added by connecting the outputs in series. The resulting sum signal will be $COS(w_c - w_s)t$ or $COS(w_c + w_s)t$, depending upon the direction of rotation, and is fed to zero crossing detector 22. The output of zero crossing detector 22 is differentiated by the combination of capacitor 50 and resistor 42, and the resulting trigger pulses are applied to one-shot 26. The output of one-shot 26, being fixed height, fixed width pulses, is fed through resistor 54 to integrating amplifer 56, the desired integrating time constant being conventionally selected by appropriate values of resistor 58 and capacitor 60 connected between the output and input of amplifier 56. As described with respect to FIG. 1, the frequency at the output of one-shot 26 is equal to the carrier frequency at zero speed, and this would produce a finite voltage from integrating amplifer 56. This voltage is reduced to zero by summing (subtracting) a reference voltage, $V_{ref}$, through resistor 66 at input terminal 64 with the output voltage of one-shot 26. The polarity of the reference voltage is selected to be opposite the polarity of the one-shot output voltage. Resistor 54 and resistor 66 are selected to effect a net zero voltage at input terminal 64 of amplifier 56 for a state of zero speed. A speed output signal of the same character described for the circuit of FIG. 1 is thus obtained and is fed to speed indicator 34 which, in the same manner, indicates the direction and speed of rotation of shaft 10.

Having thus described my invention, what is claimed is:

1. a tachometer for measuring shaft speed comprising:
   transducer means responsive to the angular position of a shaft as rotated through an angle from a reference position for providing a signal representative of the sine of the angle, SIN $w_s t$, and a signal representative of the cosine of this angle, COS $w_s t$;
   signal generating means for providing a signal proportional to the sine of the angle of a carrier frequency, SIN$w_c t$, and a signal proportional to the cosine of the angle of said carrier frequency, COS $w_c t$;
   first multiplication means responsive to said transducer means and said signal generating means for providing as a product SIN $w_s t$ SIN $w_c t$, and second multiplication means responsive to said transducer means and said signal generating means for providing a product COS $w_s t$ COS $w_c t$;
   summing means responsive to the outputs of said first and second multiplication means for providing as an output a signal proportional to $COS(w_c - w_s)t$ and, alternately, $COS(w_c + w_s)t$;
   pulse means responsive to the output of said summing means for providing as an output fixed-height, fixed width pulses of the frequency of the output of said summing means;
   integration means responsive to the output of said pulse means for providing a DC output proportional to shaft speed; and
   indication means responsive to said integration means for indicating shaft speed.

2. A tachometer as set forth in claim 1 wherein said indication means comprises:
   a source of bias equal to the output of said integration means for a condition of zero speed of a shaft; and
   difference means responsive to the output of said integration means and said source of bigs for providing as an output a zero output when shaft speed is zero and a signal of a sign indicative of the direction of shaft rotation and of a magnitude representative of the speed of the shaft.

3. A tachometer as set forth in claim 2 and including:
   a permanent magnet coupled to a shaft to be monitored in speed;
   first and second Hall effect devices, each having an electrical input and electrical output, and said Hall effect devices being positioned about the periphery of said magnet at an angular spacing of 90 degrees;
   a SIN $w_c t$ output of said signal generating means connected to said input of said first Hall effect device, and a COS $w_c t$ output of said signal generating means connected to said input of said second Hall effect defice; and
   said outputs of Hall effect devices being connected additively in series to provide said $COS(w_c - w_s)t$ and, alternatively, said $COS(w_c + w_s)t$ to said pusle means.

4. A tachometer as set forth in claim 3 wherein said pulse means comprises a zero crossing detector, a differentiator, and a one-shot multivibrator, connected serially in this order between said Hall effect devices and said integration means.

5. A tachometer as set forth in claim 2 wherein said carrier frequency is at least five times the highest frequency output of said tranducer means.

* * * * *